United States Patent
Quinn et al.

(10) Patent No.: US 9,101,856 B2
(45) Date of Patent: Aug. 11, 2015

(54) PURGE EXHAUST PROCESSOR

(75) Inventors: Leonard A. Quinn, Lagrange, OH (US); Randall W. Nichols, Westlake, OH (US); William P. Fornof, Girard, PA (US); Fred W. Hoffman, Wakeman, OH (US); Richard J. Conklin, Bay Village, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 411 days.

(21) Appl. No.: 13/486,658

(22) Filed: Jun. 1, 2012

(65) Prior Publication Data

US 2013/0319232 A1     Dec. 5, 2013

(51) Int. Cl.
*B03C 3/34* (2006.01)
*B03C 3/011* (2006.01)
*B01D 17/02* (2006.01)
*B03C 3/017* (2006.01)
*B01D 53/26* (2006.01)
*B01D 53/32* (2006.01)

(52) U.S. Cl.
CPC .............. *B01D 17/02* (2013.01); *B01D 53/261* (2013.01); *B01D 53/323* (2013.01); *B03C 3/0175* (2013.01); *B01D 2257/70* (2013.01); *B01D 2257/80* (2013.01); *B01D 2259/4003* (2013.01); *B01D 2259/40052* (2013.01)

(58) Field of Classification Search
CPC ...... B03C 3/017; B03C 3/0175; B03C 3/019; B03C 9/00; B03C 11/00; B03C 2201/20; B03C 2201/30

USPC ........................................ 95/57, 70; 96/15, 57
See application file for complete search history.

(56) References Cited

U.S. PATENT DOCUMENTS

| 4,222,748 | A | * | 9/1980 | Argo et al. ........................ 95/64 |
| 4,878,923 | A | * | 11/1989 | Muller ............................ 55/355 |
| 4,890,455 | A | * | 1/1990 | Leonhard et al. ............... 60/275 |
| 4,892,569 | A | | 1/1990 | Kojima |
| 5,002,593 | A | | 3/1991 | Ichishita et al. |
| 5,066,317 | A | * | 11/1991 | Gross et al. ...................... 96/408 |
| 5,186,522 | A | * | 2/1993 | Spencer ............................ 303/1 |
| 5,378,266 | A | * | 1/1995 | Elamin ........................... 96/114 |
| 5,385,592 | A | | 1/1995 | Maeda |
| 5,443,138 | A | | 8/1995 | Bedi et al. |
| 5,601,791 | A | | 2/1997 | Plaks et al. |
| 6,036,449 | A | * | 3/2000 | Nishar et al. .................. 417/292 |
| 6,071,321 | A | | 6/2000 | Trapp et al. |
| 6,221,136 | B1 | * | 4/2001 | Liu et al. ............................ 96/66 |
| 6,364,941 | B2 | * | 4/2002 | Liu et al. ............................ 96/60 |
| 6,514,051 | B2 | | 2/2003 | Fornof et al. |
| 6,527,821 | B2 | * | 3/2003 | Liu et al. ....................... 55/385.3 |

(Continued)

FOREIGN PATENT DOCUMENTS

DE      202004019045      *   4/2005

*Primary Examiner* — Duane Smith
*Assistant Examiner* — Sonji Turner
(74) *Attorney, Agent, or Firm* — Brian E. Kondas; Eugene E. Clair; Cheryl L. Greenly

(57) ABSTRACT

A purge exhaust processor includes an inlet chamber, a sump chamber, a selectively charged surface in the inlet chamber, and an orifice. The inlet chamber receives purge exhaust including at least one of air, water vapor, oil aerosol, and water aerosol. The selectively charged surface agglomerates at least one of the oil aerosol and water aerosol into a liquid. The orifice is sized for passing the agglomerated liquid from the inlet chamber to the sump chamber.

21 Claims, 2 Drawing Sheets

(56) References Cited

U.S. PATENT DOCUMENTS

| | | |
|---|---|---|
| 6,702,877 B1 | 3/2004 | Swanborn |
| 6,730,143 B1 | 5/2004 | Nichols et al. |
| 6,785,980 B1 * | 9/2004 | Koelzer ............................ 34/81 |
| 6,786,953 B2 | 9/2004 | Fornof et al. |
| 6,811,586 B2 | 11/2004 | Stegmaier et al. |
| 7,285,149 B2 * | 10/2007 | Fornof et al. ................ 55/385.3 |
| 7,356,987 B2 * | 4/2008 | Kiser et al. ...................... 60/278 |
| 7,488,373 B2 | 2/2009 | Haaland et al. |
| 7,544,234 B2 * | 6/2009 | Fornof .......................... 96/117.5 |
| 7,708,793 B2 | 5/2010 | Fornof et al. |
| 7,753,069 B2 | 7/2010 | Nichols et al. |
| 7,789,925 B2 * | 9/2010 | Fornof et al. ................ 55/385.3 |
| 8,043,412 B2 | 10/2011 | Carlson |

\* cited by examiner

PURGE EXHAUST PROCESSOR

BACKGROUND

The present invention relates to a compressed air dryer. It finds particular application in conjunction with reducing oil expelled to atmosphere when the air dryer is purged and will be described with particular reference thereto. It will be appreciated, however, that the invention is also amenable to other applications.

The purge exhaust of a compressed air regenerative dryer used on air braked vehicles normally consists of water mixed with some amount of oil. The oil may be introduced into the air dryer from the compressor. The water and oil are expelled from a purge exhaust valve of the air dryer during a purge cycle. For example, the water and oil may be expelled to atmosphere. Exhausting oil to atmosphere is environmentally undesirable. In addition, the oil tends to accumulate over time around the purge exhaust valve. This oil accumulation frequently leads to an incorrect perception that the compressor and/or air dryer is prematurely worn, resulting in unnecessary replacements.

Currently, compressed air condensate management separators, including baffles and coalescing elements, are used to separate oil and emulsions from the condensate water of industrial compressed air systems. However, these separators tend to be bulky, are typically designed for stationary industrial compressed air applications, and are not suitable to be mounted on motor vehicles. Wicks have also been used to transfer oil from a sump volume to an oil collector.

The present invention provides a new apparatus and method for processing purge exhaust.

SUMMARY

In one aspect of the present invention, it is contemplated that a purge exhaust processor includes an inlet chamber, a sump chamber, a selectively charged surface in the inlet chamber, and an orifice. The inlet chamber receives purge exhaust including at least one of air, water vapor, oil aerosol, and water aerosol. The selectively charged surface agglomerates at least one of the oil aerosol and water aerosol into a liquid. The orifice is sized for passing the agglomerated liquid from the inlet chamber to the sump chamber.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
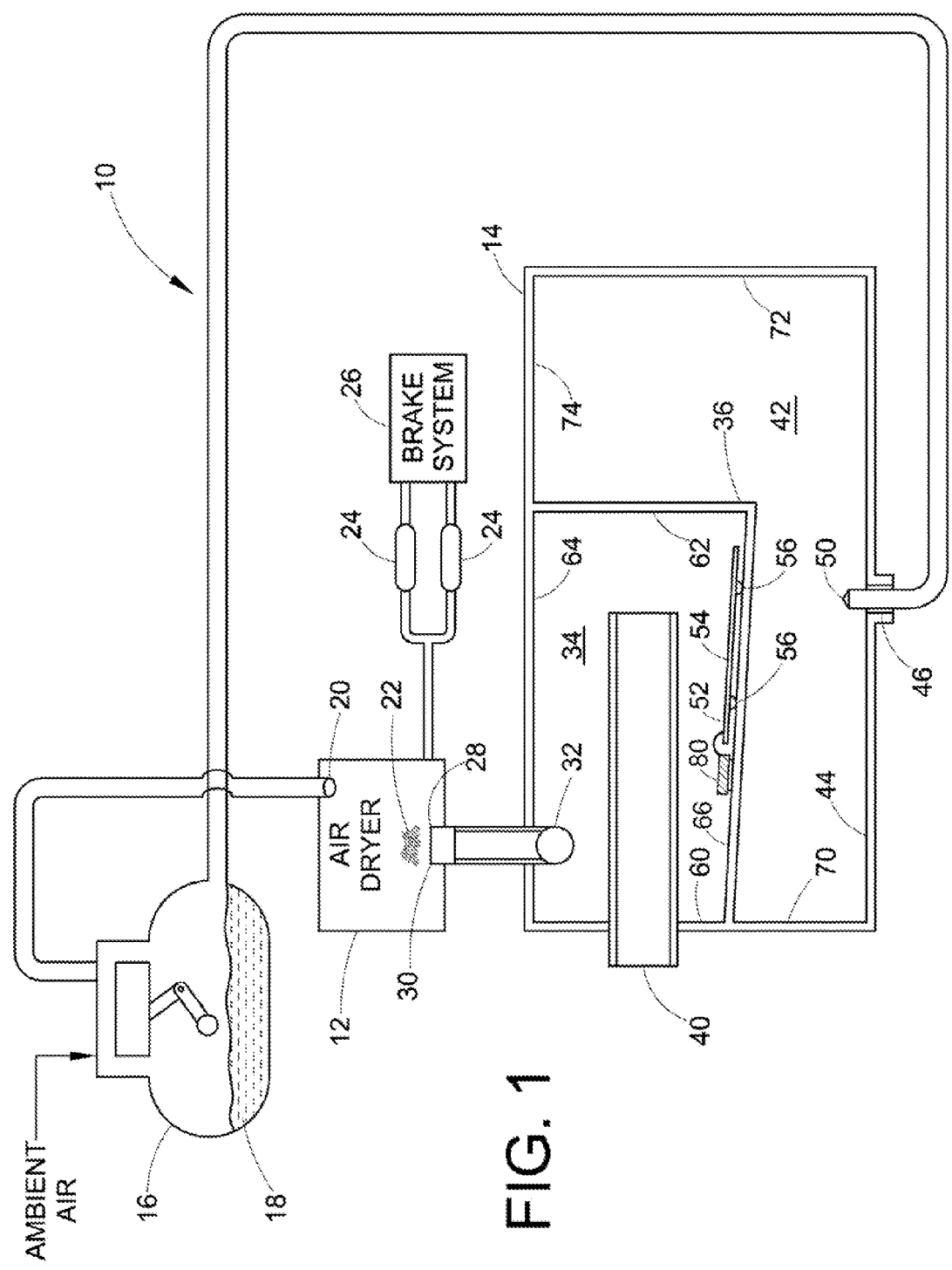
FIG. 1 illustrates a schematic representation of a system for processing purge exhaust in accordance with one embodiment of an apparatus illustrating principles of the present invention.

With reference to FIG. 1, a simplified component diagram of an exemplary system 10 for processing purge exhaust is illustrated in accordance with one embodiment of the present invention. It is contemplated that the system 10 is included on a vehicle (e.g., a heavy vehicle such as a truck or bus).

The system 10 includes an air dryer 12, a purge exhaust processor 14, and a compressor 16 including an oil reservoir 18. The compressor 16 receives ambient air and generates compressed air for fluid transmittal to a supply port 20 of the air dryer 12. The compressed air received via the supply port 20 is cleaned and/or dried by the air dryer 12. Occasionally, the air dryer 12 is purged to regenerate a drying material 22 (e.g., a desiccant) in the air dryer 12. In one embodiment, a portion of the dried air is stored and used at a later time for purging the air dryer 12. The previously cleaned/dried air is referred to as purge air. The cleaned and dried compressed air not kept as purge air is otherwise transmitted to the vehicle system reservoirs 24 for use by, for example, the vehicle air brake system 26 or other air operated components.

To purge the air dryer 12, a purge valve 28, which is positioned at a purge delivery port 30 of the air dryer 12, is opened. During the purge, the purge air is passed through the drying material 22 to remove contaminants, which may include oil and water aerosols, soot and particulates, as well as moisture captured by the drying material 22 during the drying process. Typically, the purge air is passed through the drying material 22 in a reverse direction (relative to the direction the compressed air passes to be cleaned/dried) and then exits the air dryer 12 via the purge delivery port 30.

The delivery port 30 of the air dryer 12 is fluidly connected to an air inlet port 32 (e.g., a purge inlet port) of the purge exhaust processor 14. Therefore, the purge valve 28 is fluidly connected to the inlet port 32 of the purge exhaust processor 14. The purge air exiting the delivery port 30 of the air dryer 12 is referred to as purge exhaust and includes the contaminants and moisture removed from the drying material 22. The purge exhaust is transmitted from the delivery port 30 of the air dryer 12 to an inlet chamber 34 of the purge exhaust processor 14 via the purge air inlet port 32. The purge exhaust from the air dryer 12, which includes the contaminants, such as oil and water aerosols, and moisture from the drying material 22, is processed in the purge exhaust processor 14. For example, the purge exhaust processor 14 processes the purge exhaust by separating effluent (e.g., liquid oil, liquid water, particulates, and/or other contaminants) from the remainder of the purge exhaust (e.g., air and non-liquid water). The effluent exits the inlet chamber 34 of the purge exhaust processor 14 via an outlet port 36 (e.g., an orifice), and the remainder of the purge exhaust (e.g., air and non-liquid water) escapes the exhaust processor 14 via an exhaust port 40 (e.g., a vent port). In one embodiment, the exhaust port 40 fluidly communicates the remainder of the purge exhaust from the inlet chamber 34 of the purge exhaust processor 14 to atmosphere.

The effluent exiting the inlet chamber 34 of the purge exhaust processor 14 passes to a sump chamber 42 via the outlet port 36. In one embodiment, the outlet port 36 is sized as an orifice for passing the effluent (e.g., liquid oil, liquid water or other contaminants) from the inlet chamber 34 to the sump chamber 42. The orifice is sized to pass an anticipated amount of effluent while limiting the pressurization of the sump chamber. The effluent tends to accumulate in the sump chamber 42. For example, gravity causes the effluent to accumulate along a bottom surface 44 (e.g. bottom wall) of the sump chamber 42. A drain port 46 and a drain valve 50, which is positioned in the drain port 46, are included in the sump chamber 42. The drain valve may be set between an open position, which allows the effluent to flow out of the sump chamber 42, and a closed position, which prevents the effluent from flowing out of the sump chamber 42. In one embodiment, the drain port 46 is at the bottom surface 44 of the sump chamber 42 so that, for example, gravity causes the accumulated effluent along the bottom surface to exit the sump chamber 42 via the drain port 46 when the drain valve 50 is in the open position.

It is contemplated that the drain valve 50 in the drain port 46 is set between the open and closed positions either manually or automatically. For example, an operator of the vehicle may manually open and close the drain valve 50. Alternatively, the drain valve 50 may be automatically controlled either pneumatically or electronically via, for example, an electronic control unit (not shown).

In the illustrated embodiment, the drain port 46 fluidly communicates with both the sump chamber 42 and the compressor 16. For example, the drain port 46 fluidly communicates with the oil reservoir 18 of the compressor 16. Therefore, the effluent in the sump chamber 42 is fluidly communicated from the sump chamber 42 to the oil reservoir 18 of the compressor 16 when the drain valve 50 of the drain port 46 is in the open position.

An electrostatically charged surface 52 is positioned in the purge exhaust processor 14. For example, the electrostatically charged surface 52 is positioned in the inlet chamber 34 of the purge exhaust processor 14. In the embodiment illustrated in FIG. 1, the electrostatically charged surface 52 includes a conductive plate 54 that is electrically isolated from the inlet chamber 14 and the remainder of the purge exhaust processor 14. For example, the conductive plate 54 is secured in the inlet chamber 14 via a non-conductive bracket 56 such as plastic. The bracket 56 electrically isolates the conductive plate 54 from walls 60, 62, 64, 66, which define the inlet chamber 14, and from walls 70, 72, 74 and the walls 66, 44 defining the sump chamber 42.

The electrostatically charged surface 52 is connected to an associated high voltage generating device 80. The high voltage generating device 80 generates a high voltage to charge the electrostatic surface 52.

The electrostatically charged surface 52 may be selectively charged, meaning that the high voltage generating device 80 may, for example, provide the high voltage only when the purge exhaust processor 14 is receiving purge air. Alternatively, the high voltage generating device 80 may provide high voltage to the electrostatically charged surface 52 when an associated compressor governor is in an unload mode.

Since the surface 52 is charged, oil and water aerosols in the purge exhaust are electrostatically attracted to the surface 52. The oil and water in the aerosol agglomerate on the electrostatically charged surface 52. It is contemplated that the electrostatically charged surface 52 is sloped toward the outlet port 36, which is between the inlet chamber 34 and the sump chamber 42. Therefore, gravity pulls the agglomerated liquid on the electrostatically charged surface 52 toward the outlet port 36. Gravity then continues to pull the liquid through the outlet port 36 to the sump chamber 42.

During use, purge air (e.g., purge exhaust) from the air dryer 12 is fluidly transmitted to the inlet chamber 34 of the purge exhaust processor 14 via the purge inlet port 32. A vortex is created in the inlet chamber 34 as the purge exhaust enters the inlet chamber 34 tangentially. Centrifugal forces cause relatively larger and/or heavier parts of the purge exhaust (e.g., effluent) to separate to an outside of the vortex in the inlet chamber 34. At the same time, the relatively smaller and/or lighter parts of the purge exhaust (e.g., air, non-liquid water, etc.) exit the inlet chamber 34 via the exhaust port 40. The effluent is electrostatically attracted to the conductive surface 52. Since the conductive surface 52 is angled toward the outlet port 36, gravity acts to move the effluent from the conductive surface 52, through the outlet port 36, and into the sump chamber 42.

Once the liquid effluent is in the sump chamber 42, gravity acts to pull the effluent to the bottom surface (wall) 44 of the sump chamber 42. When the drain valve 50 in the drain port 46 is in the open position, the effluent passes from the sump chamber 42 to the oil reservoir 18 of the compressor 16.

Figure 2:
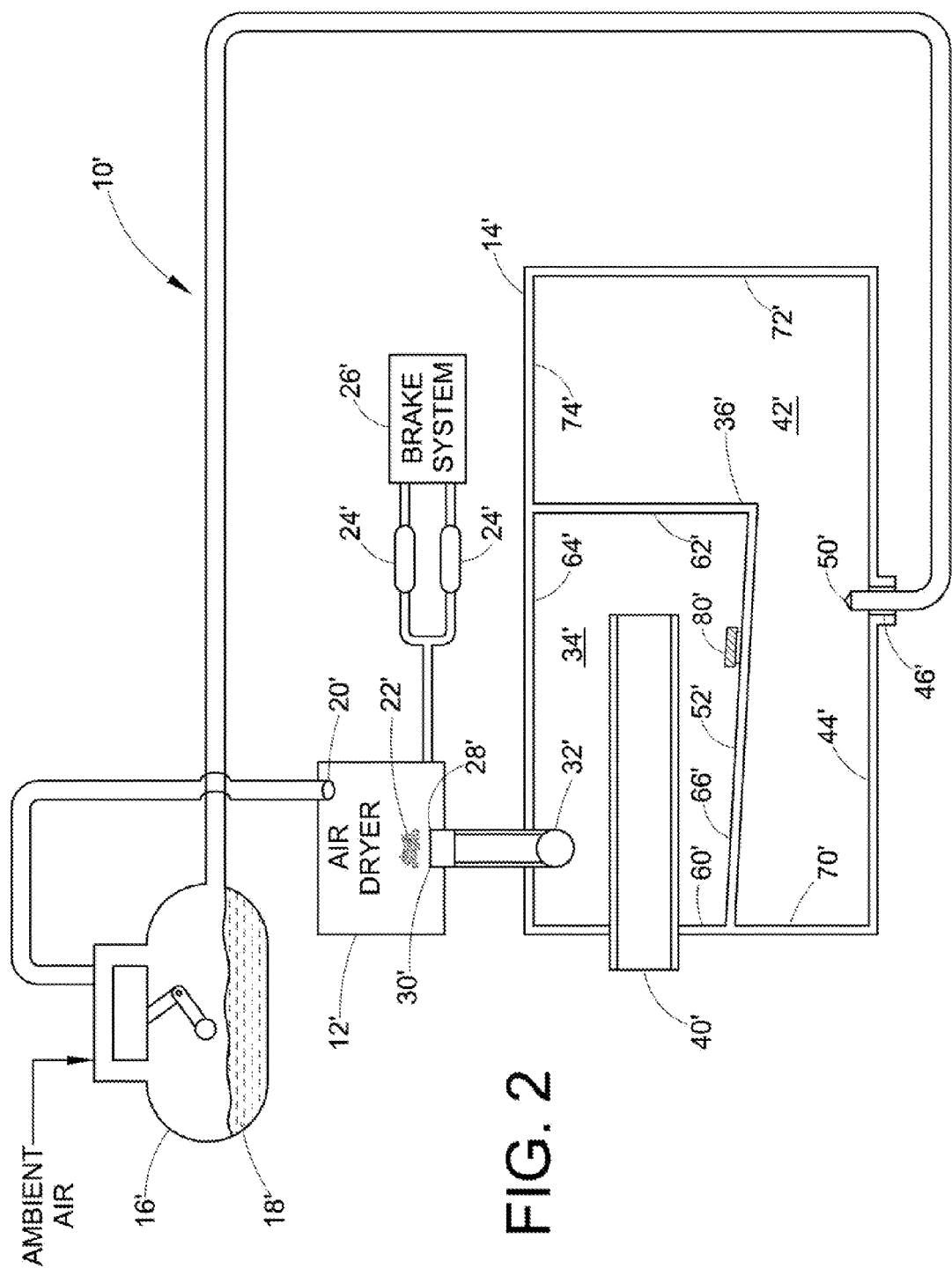
FIG. 2 illustrates a schematic representation of a system for processing purge exhaust in accordance with another embodiment of an apparatus illustrating principles of the present invention.

FIG. 2 illustrates a purge exhaust processor 14' in accordance with a second embodiment of the present invention. For ease of understanding this embodiment of the present invention, like components are designated by like numerals with a primed (') suffix and new components are designated by new numerals.

With reference to FIG. 2, one of the walls 66' of the inlet chamber 34' acts as the electrostatically charged surface 52'. In this embodiment, the wall 66' of the inlet chamber 34' is electrically conductive, while the other walls 60', 62', 64' of the inlet chamber 34' and the walls 70', 72', 74', 44' of the sump chamber 42' are non-conductive. The wall 66' is common between both the inlet chamber 34' and the sump chamber 42'. Therefore, only the wall 66' of the purge exhaust processor 14' is conductive, while all of the other walls 60', 62', 64', 70', 72', 74', 44' of the purge exhaust processor 14' are non-conductive.

It is contemplated that the conductive material of the wall 66' of the ink chamber 34' is a metal. On the other hand, the non-conductive material of the other walls 60', 62', 64', 70', 72', 74', 44' of the purge exhaust processor 14' are contemplated to be a plastic.

During use, as discussed above with reference to the first embodiment of FIG. 1, the purge air (e.g., purge exhaust) from the air dryer is fluidly transmitted to the inlet chamber 34' of the purge exhaust processor 14' of FIG. 2 via the purge inlet port 32'. A vortex is created in the inlet chamber 34' by the purge exhaust entering the inlet chamber 34' tangentially. Centrifugal forces cause relatively larger and/or heavier parts of the purge exhaust (e.g., effluent) to an outside of the vortex in the inlet chamber 34'. At the same time, the relatively smaller and/or lighter parts of the purge exhaust (e.g., air, non-liquid water, etc.) exit the inlet chamber 34' via the exhaust port. The effluent is electrostatically attracted to the conductive surface 52', which in the embodiment illustrated in FIG. 2 is the wall 66'.

As in the first embodiment, the conductive surface 52' (i.e., the wall 66') in FIG. 2 is angled toward the outlet port 36'. Therefore, gravity acts to move the effluent from the conductive surface 52', through the outlet port 36', and into the sump chamber 42'.

Once the effluent is in the sump chamber 42', gravity acts to pull the effluent to the bottom surface (wall) 44' of the sump chamber 42'. When the drain valve 50' in the drain port 46' is in the open position, the effluent passes from the sump chamber 42' to the oil reservoir of the compressor, in a similar manner that is discussed above with reference to the first embodiment of FIG. 1.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described.

Accordingly, departures may be made from such details without departing from the spirit or scope of the applicant's general inventive concept.

We claim:

1. A purge exhaust processor, comprising:
an inlet chamber for receiving purge exhaust, the purge exhaust including at least one of air, water vapor, oil aerosol, and water aerosol;
a sump chamber;
a selectively charged surface in the inlet chamber for agglomerating at least one of the oil aerosol and water aerosol into a liquid; and
an orifice sized for passing the liquid from the inlet chamber to the sump chamber.

2. The purge exhaust processor as set forth in claim 1, further including:
a purge inlet port in the inlet chamber;
a vent port in the inlet chamber communicating with atmosphere;
wherein purge exhaust enters the inlet chamber via the purge inlet port;
wherein a vortex is created by the purge exhaust entering the inlet chamber tangentially; and
wherein centrifugal force causes at east one of relatively larger parts and relatively heavier parts of the purge exhaust to separate to an outside of the vortex in the inlet chamber, while the air of the purge exhaust exits the inlet chamber via the vent port.

3. The purge exhaust processor as set forth in claim 1, wherein:
the charged surface includes a conductive plate.

4. The purge exhaust processor as set forth in claim 1, wherein:
electrically non-conductive walls define the inlet chamber and the sump chamber; and
the charged surface is secured to one of the electrically non-conductive walls.

5. The purge exhaust processor as set forth in claim 1, wherein:
the water aerosol and oil aerosol in the purge exhaust entering the inlet chamber are electrostatically attracted to the charged surface and agglomerated into a liquid;
the charged surface is angled toward the orifice; and
gravity causes the liquid to pass from the angled charged surface to the sump chamber via the orifice.

6. The purge exhaust processor as set forth in claim 5, further including:
a drain port in the sump chamber; and
a drain valve in the drain port, the liquid in the sump chamber passing from the sump chamber to a compressor oil reservoir when the drain valve is open.

7. The purge exhaust processor as set forth in claim 1, wherein:
a plurality of walls define the inlet chamber and the sump chamber;
one of the walls is electrically conductive and is electrically isolated from the other walls; and
the electrically conductive wall is the charged surface.

8. The purge exhaust processor as set forth in claim 7, wherein:
the oil aerosol and water aerosol in the purge exhaust entering the inlet chamber are electrostatically attracted to the charged electrically conductive wall;
the charged electrically conductive wall is angled toward the orifice; and
gravity causes the liquid to pass from the angled charged electrically conductive wall to the sump chamber via the orifice.

9. The purge exhaust processor as set forth in claim 1, wherein:
the orifice is sized to pass the liquid of the purge exhaust to the sump chamber; and
the orifice is sized to pass the liquid while limiting the pressurization of the sump chamber.

10. The purge exhaust processor as set forth in claim 1, further including:
a drain port in the sump chamber, the liquid in the sump chamber passing from the sump chamber to a compressor oil reservoir via the drain port.

11. The purge exhaust processor as set forth in claim 1, further including:
a vent port in the inlet chamber communicating with atmosphere wherein the air of the purge exhaust exits the inlet chamber via, the vent port.

12. A method for processing purge exhaust from an air dryer, the method comprising:
receiving purge exhaust in an inlet chamber;
electrostatically attracting water aerosol and oil aerosol in the purge exhaust to a charged surface in the inlet chamber and agglomerating at least one of the water aerosol and oil aerosol into a liquid; and
passing the liquid from the charged surface to a sump chamber.

13. The method for processing purge exhaust from an air dryer as set forth in claim 12, wherein the passing step includes:
gravitationally flowing the liquid from the charged surface to the sump chamber via an orifice.

14. The method for processing purge exhaust from an air dryer as set forth in claim 12, further including:
passing the liquid from the sump chamber to a compressor oil reservoir.

15. The method for processing purge exhaust from an air dryer as set forth in claim 12, further including:
passing air in the purge exhaust to atmosphere via a vent port in the inlet chamber.

16. The method for processing purge exhaust from an air dryer as set forth in claim 12, further including:
creating a vortex in the inlet chamber from the received purge exhaust;
passing air in the purge exhaust to atmosphere via a vent port of the inlet chamber that is positioned toward a central axis of the vortex; and
passing the particulates in the purge exhaust toward an outside of the vortex, via centrifugal force, so the particulates are relatively closer to the charged surface.

17. A system for processing purge exhaust, comprising:
an air dryer;
a compressor generating compressed air fluidly transmitted to a supply port of the air dryer;
a high voltage generating device; and
a purge exhaust processor, including:
an inlet port fluidly connected to a purge valve of the air dryer, the purge exhaust processor receiving purge exhaust from the air dryer, the purge exhaust including air, water aerosol and oil aerosol;
an inlet chamber receiving the purge exhaust via the inlet port;
a sump chamber;
a charged surface, in the inlet chamber connected to the high voltage generating device, that electrostatically attracts the water aerosol and oil aerosol of the purge exhaust and agglomerates the water aerosol and oil aerosol into a liquid; and an orifice sized for passing the liquid from the charged surface to the sump chamber.

18. The system for processing purge exhaust as set forth in claim 17, wherein:

the charged surface includes a conductive plate electrically isolated from walls of the inlet chamber and the sump chamber.

19. The system for processing purge exhaust as set forth in claim 17, wherein:

the charged surface is at least a part of one of a plurality of walls of the inlet chamber; and the wall including the charged surface is electrically isolated from the other walls of the inlet chamber.

20. The system for processing purge exhaust as set forth in claim 17, wherein:

the charged surface is downwardly sloped toward the orifice; and gravity causes the particles on the charged surface to flow to the sump chamber via the orifice.

21. A purge exhaust processor, comprising:

an inlet chamber;

a sump chamber;

means for attracting effluent in purge exhaust; and means for passing the effluent from the inlet chamber to the sump chamber.

\* \* \* \* \*